United States Patent [19]
Rowland-Hill

[11] 3,943,939
[45] Mar. 16, 1976

[54] COMBINE WITH ADJUSTABLE FEED PLATE

[75] Inventor: Edward W. Rowland-Hill, Lancaster, Pa.

[73] Assignee: Sperry Rand Corporation, New Holland, Pa.

[22] Filed: Mar. 25, 1975

[21] Appl. No.: 561,955

[52] U.S. Cl. .............................. 130/27 T; 56/14.6
[51] Int. Cl.² ........................................ A01F 7/06
[58] Field of Search ............ 56/14.5, 14.6, 122–125; 130/27 R, 27 H, 27 HF, 27 HA, 27 J, 27 JT, 27 K, 27 L, 27 P, 27 Q, 27 S, 27 T

[56] References Cited
UNITED STATES PATENTS

| | | | |
|---|---|---|---|
| 3,626,472 | 12/1971 | Rowland-Hill | 130/27 T |
| 3,664,100 | 5/1972 | Rowland-Hill | 56/14.6 |
| 3,756,248 | 9/1973 | Mathews | 130/27 JT |
| 3,848,609 | 11/1974 | Mortier et al. | 130/27 T |

Primary Examiner—Russell R. Kinsey
Attorney, Agent, or Firm—C. Hercus Just; Frank A. Seemar; John R. Flanagan

[57] ABSTRACT

In a combine having a header to cut crop material and an elevator to deliver the cut crop material to auger means in an undershot manner for feeding the same to threshing rotor of an axial flow combine, there is provided an adjustable transition or feed plate between the upper end of the elevator and the forward end of the rotor means to adapt the combine to accommodate crops of different types of texture, bulk, character and moisture content and prevent back-feeding of the crop material down the elevator. The adjustment is readily made manually and externally of the combine.

12 Claims, 3 Drawing Figures

COMBINE WITH ADJUSTABLE FEED PLATE

CROSS REFERENCE TO RELATED APPLICATIONS

This application is one of a limited series of applications filed on even dates herewith and respectively pertaining to different improvement inventions applicable generally to an axial flow combine of the type, for example, shown and described in U.S. Pat. No. 3,664,110, dated May 23, 1972, and assigned to the same assignee as the instant invention.

BACKGROUND OF THE INVENTION

Combines for harvesting grain crops such as wheat, barley, oats and the like have been known for many years. The use of combines to harvest grain crops of this type has permitted the efficient production of said type grain grown on very extensive fields with minimum use of labor and consumption of time. Progressively, combines have been developed capable of harvesting wider swaths of grain than previously harvested by earlier combines and this has resulted in the combines being larger and more powerful, as well as more expensive than such earlier combines.

The increase in cost of such aforementioned improved combines also has led to attempts to develop combines capable of harvesting a wider variety of seed or grain crops than capable of being handled by earlier combines, adapting such combines for said harvesting of a wider variety of crops however being made possible by minimum requirements of exchanging certain elements of the combine for others, especially the headers and elevators. For example, harvesting corn requires a different type of header to cut and elevate the corn stalks and ears to the threshing mechanism than is required for harvesting wheat, oats, and similar headed stalk crops. Further, harvesting bean or other pod-like crops requires different header structures from those used to harvest corn and wheat-like crops for example.

With respect to the threshing and separating mechanism of the combine however, it is preferred that the same be adapted to thresh and separate substantially all types of seed type crops for purposes of threshing and separating the seed from the stalks, vines and other waste material, the latter being discharged upon the field as the combine moves along the same in a harvesting operation.

It readily can be appreciated that adapting a combine to harvest, thresh and separate a wide variety of crop materials of the type referred to above makes it necessary that the combine handle a substantial variety of different types of crops varying as to bulk, moisture content, toughness of the stalk or vine included in the crops and otherwise. Preferably, by adjusting the spacings between the rotors and concaves in threshing and separating areas of the combine, this part of the apparatus has been developed sucessfully and comprises, for example, the subject matter of the following prior patents, all of which are assigned to the assignee of the present invention:

| | |
|---|---|
| 3,626,472 | Dec. 7, 1971 |
| 3,645,270 | Feb. 29, 1972 |
| 3,664,100 | May 23, 1972 |
| 3,794,047 | Feb. 26, 1974 |

Notwithstanding the capabilities of the inventions comprising the subject matter of the foregoing patents, it now has been found that additional features render such universal type combines even more efficient and effective. For example, referring to said aforementioned U.S. Pat. Nos. 3,626,472 and 3,794,047 there is a ramp which extends between the upper end of the bottom plate of the elevator, upwardly and rearwardly toward the forward end of the rotor of the threshing and separating mechanism. Said ramp also constitutes a transition or feed plate and, as shown in said patents, said ramp or feed plate is of a fixed nature. Said combines are of the type in which the lower span of the elevator feeds the crop material upwardly and rearwardly toward the forward end of the rotors, delivering the same to the rotors in a so-called undershot manner. The rotors conventionally employ an auger at the forward end thereof which is rotated by power means in a direction to feed the crop material inwardly to the rotors for engagement by said rotors and concaves associated therewith in the combine which is of the axial flow type, the same being the type to which the present invention pertains.

Depending upon the nature and character of the crop and especially the toughness thereof, moisture content, bulk and the like, it has been found that a fixed type of ramp, transition or feed plate to guide the crop material from the upper end of the elevator toward the forward end of the rotor of the combine is not readily capable of accommodating all types of such crop conditions efficiently. For example, if the bulk is too great at any instant, because of a sudden surge or momentary increase in the amount of the crop material being delivered by the elevator to the rotor, excess material which cannot be accepted by the auger and rotor will be returned by the upper span of the elevator toward the header for recycling of the same by the lower span of the elevator. Obviously, such operation is wasteful and undesirable. Therefor, it is the principle object of the present invention to render a combine of the type described capable of accommodating a wide variety of different types of crops, such as those varying in bulk, moisture content, and the like by including certain improvements consitituting the essential features of the present invention, details of which are described hereinafter.

SUMMARY OF THE INVENTION

It is the principle object of the present invention to provide between the upper end of the elevator of an axial flow type combine and the forward end of the rotor and the threshing and separating elements incorporated in the combine, a ramp, transition or feed plate which is spaced below feeding means, such as an auger, mounted on the rotor forward end and together therewith defines a passageway for crop material from the upper end of the elevator to the forward rotor end, with the ramp defining the lower boundary of the passageway and being adapted to guide crop material from the elevator through the passageway upon operation of the auger.

It is another object of the invention to provide means for adjusting the ramp toward and away from the auger to vary the cross-sectional size of the passageway in accordance with the nature and bulk of the crop material and thereby effect efficient feeding of crop material by the auger from the elevator to the foward end of the rotor.

It is a further object of the invention to provide such ramp or feed plate in the form of a plurality of articulated plate members, one of which is hingedly connected to the combine adjacent the lower forward end of the rotor and casing and is capable of being disposed at different angular relationships relative to the axis of said hinged connection, and clamping means secured in said plate in a desired angular adjusted position, the adjustment being capable of being made exteriorly of the opposite sides of the combine.

It is a further object of the invention to hingedly connect said plurality of plate members together along an axis transverse to the axis of the rotor, said plate members extending between opposite sides of the inlet end of the combine and the outer end of the outermost plate member extending to and underlying the upper end of the bottom plate of the elevator and supported by transverse support means adjacent said bottom plate of the elevator.

Still another object of the invention is to provide an additional guide plate which is connected pivotally to the upper end of the bottom plate of the elevator and extends upward and rearwardly therefrom toward the auger and rotor of the combine, the upper end of said additional guide plate being spring pressed into firm engagement with the hingedly connected pair of plate members of the ramp or feed plate, whereby when the articulated plate members of the ramp or feed plate are moved to different positions toward and from the axis of the auger and rotor for example, the upper end of the additional guide plate will firmly engage the upper surface of said articulated plate members and thereby prevent any escape of crop material therebetween.

It is still another object of the invention to provide the opposite edges of the aforementioned plate member, which is hingedly connected at one end adjacent the forward end of the rotor and concave of the combine, with side members which extends substantially perpendicularly to the plate member and are provided with arcuate slots which are segmental arcs of a circle of which the pivotal axis of said plate member is the center, and bolt means extending through holes in side plates of the combine also extend through said arcuate slots and are operable to clamp said side members of said plate member firmly against the sides of said combine ajacent the inlet to said rotor and casing.

It is a still further object of the invention to provide such adjustable mounting for the ramp or feed plate means in a combine having a pair of axial flow rotors and casing as well as augers on the forward ends of said rotor, such ramp or feed plate means extending transversely across the full width of the inlet end of the combine for the delivery of crop material to thw forward ends of the augers and rotors thereof, the flights of the rotors respectively being in opposite spiral directions and the power means of the combine respectively driving said rotors and augers in opposite rotatable directions adapted to feed the crop material toward the central portion of the inlet feed space in the combine which is immediately above the ramp or feed plate comprising the present invention.

Details of the foregoing objects and of the invention, as well as other objects thereof, are set forth in the following specification and illustrated in the accompanying drawings comprising a part thereof.

DETAILED DESCRIPTION OF THE DRAWINGS

DETAILED DESCRIPTION

Figure 1:
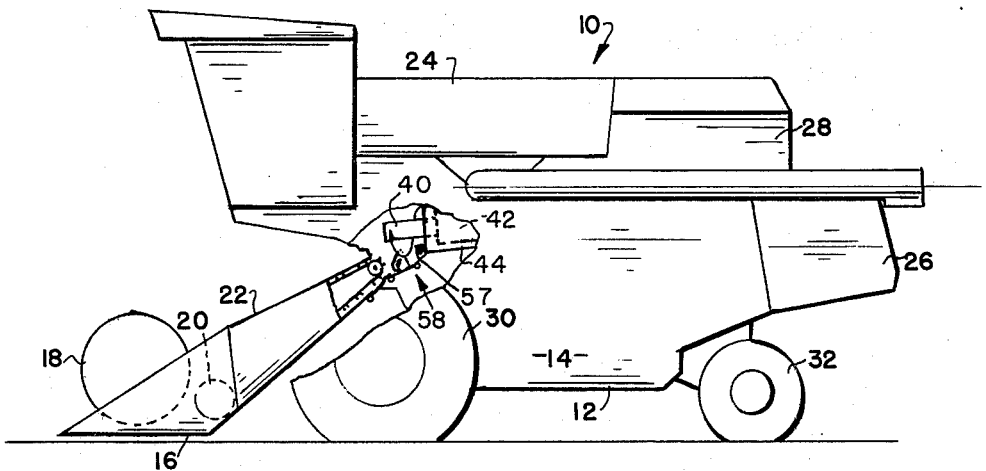
FIG. 1 is a side elevation of an exemplary combine of the axial flow type to which the present invention pertains, part of the figure being broken away to disclose details of the interior thereof.

Referring to FIG. 1, the combine 10 is generally of the type illustrated, for example, in said aforementioned U.S. Pat. Nos. 3,626,472 and 3,794,047. Said combine is of the axial flow type and includes a housing 12 in which the threshing and separating mechanism of the combine is included. Said housing is defined by opposite side plates 14. The forward end of the combine 10 has a header 16 detachably connected thereto for replacement by different types of crop cutting and converging mechanism. The header 16 shown in FIG. 1 also includes a reel 18 and a converging auger 20 which is at the forward end of the elevator 22 which is of the undershot type.

After the grain is threshed and separated within the housing 12, the grain is elevated by suitable means of conventional type to the grain bin 24 and the straw, vines and other waste material of the crop are discharged through the rear discharge compartment 26. All of the moving elements of the combine 10 are driven by an internal combustion engine within the engine compartment 28, said engine being of substantial horsepower and adapted not only to drive all of the moving components of the combine but also operating the drive wheels 30 of the combine which, together with the rear wheels 32, render the combine mobile.

Figure 2:
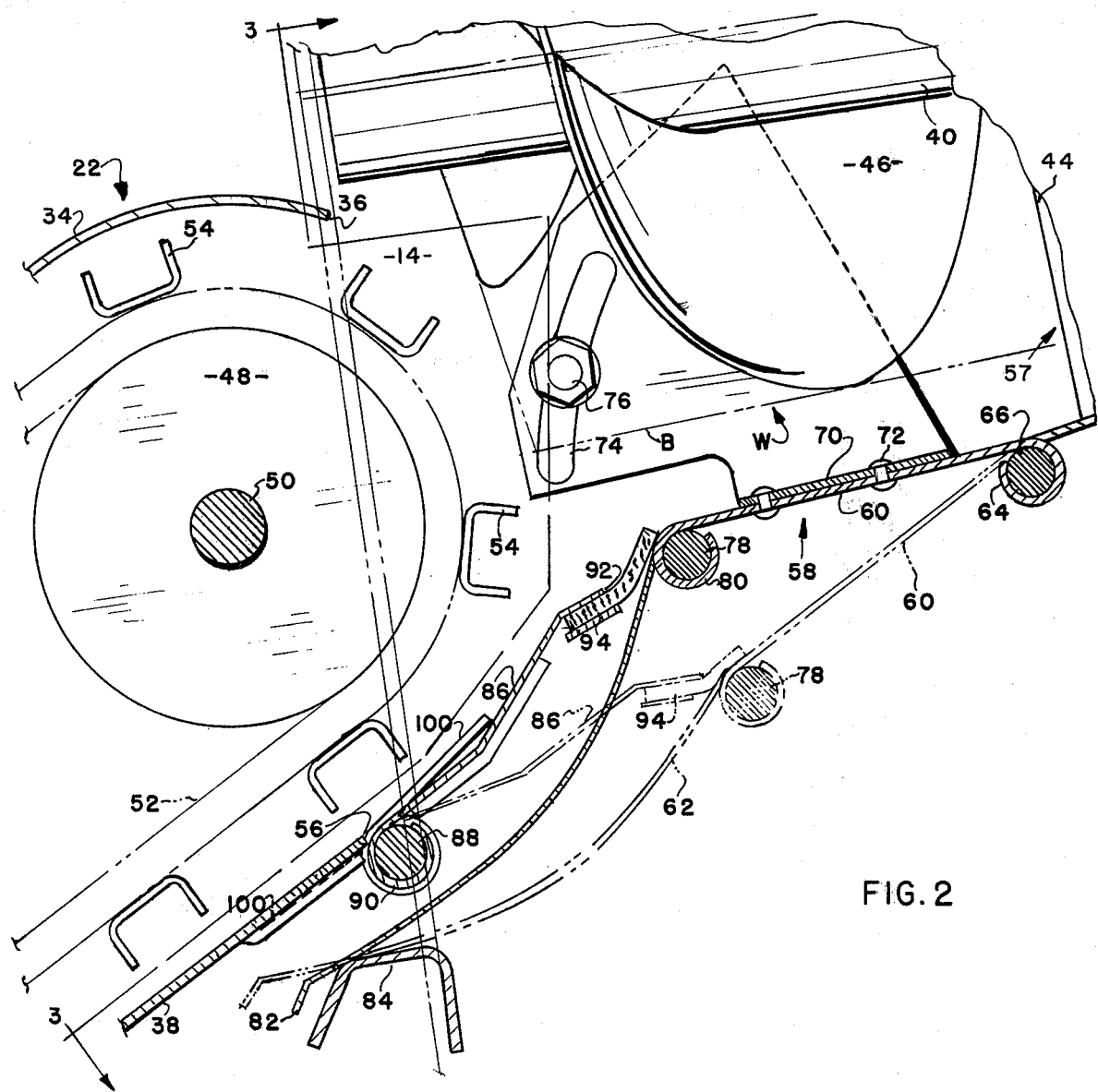
FIG. 2 is a fragmentary vertical sectional elevation of the portion of the combine in the area which is broken away in FIG. 1, the same being illustrated on a substantially larger scale than employed in FIG. 1 and showing details of the feed or transition plate comprising the essential features of the present invention.

Referring to FIG. 2, it will be seen that the elevator 22 comprises an upper plate 34 which extends transversely across the entire width of the elevator and terminates in a rearwardly and downwardly curved extremity 36. The elevator 24 also includes a bottom plate which, as can be seen from FIG. 1, normally extends upwardly and rearwardly from the header 16 to an auger 40 mounted on the forward end of a rotor 42, the forward end of the latter being fragmentarily illustrated in FIG. 2. As can be seen from FIG. 3, in the preferred construction of the combine 10, there is a pair of augers 40 which are respectively operable adjacent the forward end of substantially cylindrical casings 44 which also enclose the rotors 42. The rotors 42 and casings 44 and the mounted crop threshing and separating elements which, although not shown in the subject application, drawings, are shown in said aforementioned patents, to which attention is directed for further information on the same.

Figure 3:
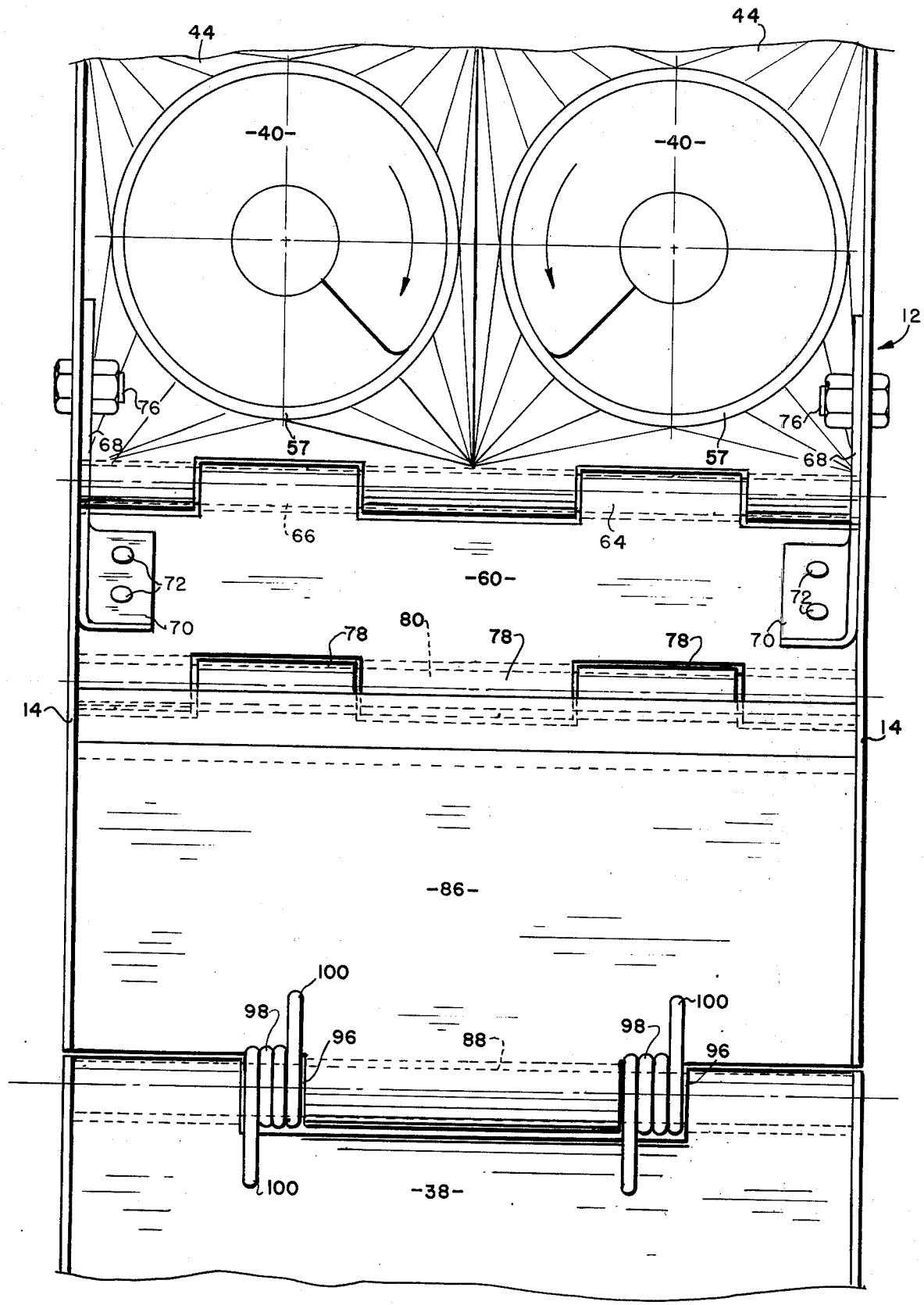
FIG. 3 is a fragmentary elevation showing partially in plan view details of the portion of the combine which is illustrated in FIG. 2, as seen on the line 3—3 of FIG. 2.

The power means within engine compartment 28 is suitably connected to the rear ends of the rotors 42 to drive the same and the augers 40 mounted to the forward ends thereof in opposite rotary directions, as indicated by the arcuate arrows on the rotors shown in FIG. 3. Also, the spiral flights 46 of the augers 40 respectively are spiralled in opposite direction so that when the rotors and augers are driven respectively in opposite rotary directions, the flights 46 of the augers 40 respectively will tend to feed the crop material toward the center of the combine, away from the opposite side plates 14 thereof.

The elevator 22 also includes at opposite ends thereof, a series of sprocket gears 48 mounted upon the upper shaft 50 of the elevator, as shown in FIG. 2, and endless chains 52 extend around the sprocket gears respectively at opposite ends of the elevator for purposes of supporting a series of longitudinally spaced, transversely extending elevator bars 54 which aggressively engage the crop material which is slidably advanced along the bottom plate 38 to deliver the same in an undershot manner to the lower portions of the augers 40. It will be seen in FIG. 2 that the upper end 56 of bottom plate 38 terminates adjacent the sprocket gears 48 and therefore it is necessary to provide suitable support and transport means for the crop material between the upper or terminal end 56 of bottom plate 38 of the elevator and the forward ends of the rotors 42.

In the combine inventions illustrated in said aforementioned patents, stationary ramp members are provided which are spaced below the augers 40 and extend from the upper ends of the bottom plate 38 of the elevator to the forward ends of the rotors. However, such an arrangement has been less than continuously satisfactory due to the difference in either continuous or momentary bulk of a certain type of crop material as compared with that of another type or kind of crop material. Differences in moisture content also will affect the nature of the feeding of the crop material from the elevator to the augers and rotors. Accordingly, under circumstances where a greater bulk, for example, of a certain type of crop material is being delivered to the augers and rotors from the elevator than can readily be accommodated by the passageway defined between said aformentioned ramp and augers, the excess amounts of said bulk of material were carried away from the augers by the upper spans of the endless material conveying apron of the elevator comprising the chains 52 and bars 54. Such operation is wasteful of energy since the material that is backfed down the elevator has to be recycled and conveyed upwardly again to the augers, possibly resulting in additional excess volume and thereby rendering the operation of the combine inefficient.

The foregoing situation is substantially eliminated by the principal feature of the present invention which comprises a type of ramp or feed plate, also comprising a transition plate, which is spaced below the augers 40 and which extends from the upper or terminal end 56 of the bottom plate 38 of the elevator to the forward ends of the rotors 42 and a forward inlet opening 57 of the casings 44. The ramp and augers 40 define a passageway for crop material from the upper end 56 of the bottom to the forward inlet opening of the casings 44, with the ramp defining the lower boundary of the passageway and being adapted to guide crop material through the passageway upon rotation of the augers 40. Details of such improved ramp or feed plate are shown in FIGS. 2 and 3, said details and the function thereof being described as follows.

The ramp or feed plate 58 consists preferably of a pair of plates respectively identified as a first plate 60 and a second plate 62. The end of the first plate 60 which is nearest the rotor 42 is connected by suitable hinge means 64 to a transversely extending pivotal means 66 which extends between the opposite side plates 14 of the housing of the combine. Said first plate also is of sufficient width to extend between said side plates 14 and, secured to the opposite sides of plate 60 are a pair of side members 68, the lower edges of which have inwardly turned flanges 70 which are affixed to the opposite side edges of plate 60 by any suitable means such as rivets 72. The shape of the side members 68 is best illustrated in FIG. 2 and it will be seen that they are provided with similar arcuate slots 74 which comprise arcs of a circle having the axis of pivotal means 66 as a center. Bolts 76 extend through suitable holes in the side plate 14 of the housing 12 of the combine, as shown in FIGS. 2 and 3, whereby when nuts are tightened on said bolts the side members 68 are tightly clamped against the inner surfaces of said side plates 14, in firm parallel relationship therewith, whereby it will be seen that the plates 60 may be disposed at various angles about the axis of the pivot means 66 and thereby vary the cross-sectional size of the passageway defined between the plate 60 and the auger 40 which the crop material is moved from the elevator to the rotors 42. One position of the plate 60 is shown in full lines in FIG. 2, while another position at a greater angle to the auger 40 is shown in phantom in said figure. An infinite number of other angular positions is possible for purposes of providing a passageway of suitable crosssectional size and profile through which a particular crop material may be moved from the elevator to the rotors 42 without appreciable backfeeding of any of the material down the upper span of the flexible material conveying apron of the elevator and thereby resulting in efficient feeding of the crop material in an undershot manner to the auger 40 for immediate transfer to the rotors 42 where said material is threshed by operation of the rotors with respect to a concave, not shown, on the casings of the types shown in said aforementioned patents, which are adjacent the lower portions of the rotors 42.

The forward end of plate 60 also is hingedly connected to the uppermost end of second plate 62, portions of the adjacent ends of said plates 60 and 62 being formed in cylindrical configurations to constitute hinged members 78, best shown in FIG. 3, which interfit and receive an elongated transverse pin 80 therethrough to form a flexible connection between plates 60 and 62. The lower forward end 82 of plate 62 is supported by a stationary transverse member 84 shown in FIG. 2 which slidably supports said forward end of plate 62 by gravity. It will be seen that the lower forward end 82 of plate 62 underlies the upper end portion of bottom plate 38 of the elevator.

In order that there will be no appreciable possibility for crop material to escape between the bottom plate 38 and the upper surface of second plate 62, the present invention also includes an additional guide plate 86 which also extends between the opposite sides of the housing of elevator 22 and the side plates 14 of the combine. The lower, forward end of additional plate 86 is pivotally supported by transversely extending rod 88 around which a cylindrical end 90 of plate 86 extends to establish a pivotal support for said forward end of plate 86. The opposite end 92 preferably is provided with a compressible sealing gasket strip 94, such as rubber or material similar in nature thereto, which slidably abuts the upper surface of plates 60 and/or 62, depending upon the adjusted position of said plates for purposes of accommodating a particular type or kind of crop being harvested by the combine.

To insure maximum sealing effect by the plate 86 and strip 94, the cylindrical end 90 of plate 86 is provided with short openings 96 which are best shown in FIG. 3 adjacent the lower portion thereof, for purposes of receiving coiled portions of springs 98 having legs 100 on the opposite ends thereof which respectively abut the upper surfaces of bottom plate 38 of the elevator and additional guide plate 86, as clearly shown in FIGS. 2 and 3, for purposes of constantly biasing the opposite end 92 of plate 86 and the sealing gasket strip 94 into firm engagement with the upper surface of plate 60 and/or 62.

From the foregoing, it will be seen that the present invention provides relatively simple, very durable and highly effective adjustable ramp or feed plate mechanism extending between the upper end of bottom plate 38 of the elevator and the forward ends of the rotors 42 for purposes of adjusting the depth, in a substantially vertical direction, and thereby the cross-sectional size, of the passageway for the crop material from the elevator to the rotors while moving along the path of the material therebetween. The adjustability of said depth is accomplished externally of the combine by loosening the bolts 76 which, as shown in FIG. 3, are readily accessible on the exterior of the housing 12 of the combine. Also, the lower surface of the plates 60 and 62 are accessible from the exterior of the combine. Adjustment of the feed plate primarily is accomplished empirically, such as by making an adjustment, operating the combine for a limited period and inspecting the results, and readjusting the position of the plates 60 and 62 if found to be necessary. When the preferred adjustment is ultimately made, the combine usually may be used continuously for a specific kind of crop without further adjustment being necessary.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. In an axial flow combine having means for elevating crop material from the field to a terminal end thereof and at least one axially arranged threshing and separating unit, said unit including an elongated casing having a forward inlet opening for receiving crop material being disposed rearwardly from said terminal end of said elevating means, a rotor arranged coaxial with and mounted for rotation relative to said casing and elements arranged along said rotor and said casing for coaction together to thresh and separate crop material upon rotation of said rotor, said rotor having feeding means on a forward end thereof adjacent said casing inlet opening and being operable for feeding crop material to said casing inlet opening and said rotor end upon rotation of said rotor, the improvement which comprises: feed ramp means being spaced below said feeding means and together therewith defining a passageway for crop material from said terminal end of said elevating means to said casing inlet opening, said ramp means defining the lower boundary of said passageway and being adapted to guide crop material from said elevating means through said passageway upon operation of said feeding means; and means for adjusting said ramp means toward and away from said feeding means to vary the cross-sectional size of said passageway in accordance with the nature and bulk of said crop material and thereby effect efficient feeding of said crop material by said feeding means from said eevating means to said casing inlet opening and said rotor end.

2. The combine according to claim 1 in which said feed ramp means comprises a pivotally articulated plurality of plate-like members, said articulation being intermediately between said terminal end of said elevating means and the forward inlet opening of said casing, thereby rendering said feed ramp means pivotally flexible to dispose portions thereof at different positions relative to said feeding means, and said adjusting means comprises means to secure said members at a desired one of said positions.

3. The combine according to claim 1 in which said feed ramp means comprises a pair of plate-like members, hinge means connecting together adjacent ends of said members about an axis transverse to the rotational axis of said rotor, said hinge means being located intermediately between remote ends of said members, first support means disposed adjacent the forward inlet opening of said casing and extending transversely to said rotational axis of said rotor, means pivotally connecting a remote end of one of said members to said support means, and second support means disposed adjacent said terminal end of said elevating means and below the same with a remote end of said other member slidably engaging said second support member for support thereby.

4. The combine according to claim 1 in which said feed ramp means comprises a plate-like guide member for crop material movably supported for angular adjustment adjacent the forward inlet opening of said casing and extending toward said terminal end of said elevating means, and said adjusting means comprises means to secure said plate-like guide member in a desired angular position between said casing and said elevating means.

5. The combine according to claim 4 in which said feed ramp means further comprises a support member extending transversely to the rotational axis of said rotor and being mounted adjacent said terminal end of said elevating means and below the same to support and guide the end of said plate-like member nearest said terminal end of said elevating means.

6. The combine according to claim 4 in which said feed ramp means further comprises a support means disposed adjacent the forward inlet opening of said casing and extending transversely to said rotational axis of said rotor between opposite sides of said combine, said plate-like guide member of said feed ramp means having one end pivotally connected to said support means, and said securing means of said adjusting means comprises side members secured respectively to opposite sides of said plate-like guide members and extending adjacently along said opposite sides of said combine for movable relationship therewith upon pivoting of said guide member and means to clamp said side members in fixed relationship to respective opposite sides of said combine to secure said guide member in a desired angular position relative to the forward inlet opening of said casing.

7. The combine according to claim 4 in which said feed ramp means further comprises an additional guide plate movably supported at one end adjacent said terminal end of said elevating means with the other end of said additional guide plate overlying said plate-like guide member and slidably engaging the same to provide continuous guide and support for crop material from said elevating means to said forward inlet opening of said casing.

8. The combine according to claim 7 in which said feed ramp means further comprises spring means engagable with said additional guide plate and operable to maintain said other end thereof in firm engagement with said platelike guide member at all times, thereby to prevent the escape of crop material between said additional guide plate and said plate-like guide member.

9. The combine according to claim 1 in which said feed ramp means comprises support means disposed adjacent the foward inlet opening of said casing and extending transversely to said rotational axis of said rotor, a first plate pivotally connected at one end to said support means, a second plate pivotally connected at one end to an opposite end of said first plate and extending forwardly to an opposite end, transverse means arranged to support said opposite end of said second plate at a position below said terminal end of said elevating means, an additional guide plate pivotally supported at one end adjacent said terminal end of said elevating means above said opposite end of said second plate and about an axis transverse to said rotational axis of said rotor, said additional guide plate extending to an opposite end which slidably engages surface portions of said pivotally connected first and second plates depending upon the respective adjusted positions thereof resulting from pivotal movement thereof toward and away from said feeding means, and in which said adjusting means comprises means to clamp said first and second plates in a desired one of their adjusted positions.

10. The combine according to claim 10 in which said feed ramp means further comprises spring means engagable with said additional guide plate and operable to bias said opposite end thereof into engagement with said surface portions of said first and second plates depending upon the respective adjusted position thereof.

11. The combine according to claim 8 in which said adjusting means further comprises side members secured respectively to opposite sides of said first plate and extending adjacently along respective opposite sides of said combine for movable relationship therewith upon pivoting of said first plate, said clamping means of said adjusting means being operable to clamp said side members to respective opposite sides of said combine for securing said first and second plates in a desired one of their adjusted positions.

12. The combine according to claim 9 in which said feed ramp means further comprises yieldable sealing shoe means attached to the underside of said opposite end of said additional guide plate, said sealing shoe means being directly engagable with said surface portions of said first and second plates and operable to seal engagement of said additional guide plate relative to said first and second plates.

* * * * *